United States Patent
Ong

(10) Patent No.: US 8,615,370 B2
(45) Date of Patent: Dec. 24, 2013

(54) SAND DETECTION USING MAGNETIC RESONANCE FLOW METER

(75) Inventor: Joo Tim Ong, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 256 days.

(21) Appl. No.: 13/151,798

(22) Filed: Jun. 2, 2011

(65) Prior Publication Data

US 2012/0310553 A1 Dec. 6, 2012

(51) Int. Cl.
*G01F 1/00* (2006.01)
*G01V 3/00* (2006.01)

(52) U.S. Cl.
USPC .............................................. 702/49; 324/307

(58) Field of Classification Search
USPC ............. 702/49, 1–2, 6–9, 11–14, 22–23, 25, 702/27–28, 31–32, 45–46, 50, 81, 84, 127, 702/134, 188–189; 324/300, 303, 307, 309, 324/312–313, 319, 322
See application file for complete search history.

(56) References Cited

U.S. PATENT DOCUMENTS

| | | |
|---|---|---|
| 4,240,287 A | 12/1980 | Mast et al. |
| 4,866,385 A | 9/1989 | Reichwein |
| 5,828,214 A | 10/1998 | Taicher et al. |
| 6,278,277 B1 | 8/2001 | Zeiger |
| 2004/0017193 A1 | 1/2004 | Speier |
| 2009/0157315 A1 | 6/2009 | Ong |
| 2010/0057378 A1 | 3/2010 | Chen et al. |

OTHER PUBLICATIONS

Oswald et al., Time-Dependent Measurement of Strongly Density-Dependent Flow in a Porous Medium Via Nuclear Magnetic Resonance Imaging, 2002, Transport in Porous Media 47, pp. 169-193.*
Ong et al., In Well Nuclear Magnetic Resonance (NMR) Multiphase Flowmeter in the Oil and Gas Industry, SPE Annual Technical Conference and Exhibition, Houston, Texas, Sep. 26-29, 2004, SPE 89978, 10 pp.*
International Search Report and Written Opinion dated Nov. 30, 2012 for International Application No. PCT/US2012/036476.

* cited by examiner

*Primary Examiner* — Toan Le
(74) *Attorney, Agent, or Firm* — Cantor Colburn LLP

(57) ABSTRACT

A method, apparatus and computer-readable medium for estimating a mass of silicates in a fluid flowing in a member is disclosed. A magnetic field is induced in the fluid to align nuclei of the fluid along a direction of the magnetic field. A radio frequency signal is transmitted into the fluid from a transmitter to excite silicon nuclei present in the fluid. A signal is received from the silicon nuclei responsive to the transmitted radio frequency signal at a receiver. A processor estimates the mass of silicates in the fluid directly from the received signal.

17 Claims, 4 Drawing Sheets

SAND DETECTION USING MAGNETIC RESONANCE FLOW METER

BACKGROUND OF THE DISCLOSURE

1. Field of the Disclosure

The present disclosure is related to detecting the presence of silicates in flowing fluids.

2. Description of the Related Art

Production operations recover fluids such as gas and/or liquid hydrocarbons from an underground formation via a production tubular. Solid particles, such as sand (silicate) grains, are often carried in the recovered fluid through the production tubular. These sand grains can cause erosion of various components of the production tubular, such as a pump for pumping the fluid, a flow control valve located on the tubular and the tubular itself. The effects of sand erosion can be costly to a production operation. The present disclosure provides a method and apparatus for estimating amount of silicates in a fluid flowing in a production tubular in order that preventative actions can be taken.

SUMMARY OF THE DISCLOSURE

In one aspect, the present disclosure provides a method of estimating a mass of silicates in a fluid flowing in a member, including: inducing a magnetic field in the fluid to align nuclei of the fluid along a direction of the magnetic field; transmitting a radio frequency signal into the fluid from a transmitter to excite silicon nuclei present in the fluid; receiving a signal from the silicon nuclei responsive to the transmitted radio frequency signal at a receiver; and using a processor to estimate the mass of silicates in the fluid directly from the received signal.

In another aspect, the present disclosure provides an apparatus for estimating a mass of silicates in a fluid flowing in a member, including: a magnetic source configured to induce a magnetic field in the fluid to align nuclei of the fluid along a direction of the magnetic field; a transmitter configured to transmit a radio frequency signal into the fluid to excite silicon nuclei present in the fluid; a receiver configured to receive a signal from the silicon nuclei responsive to the transmitted radio frequency signal; and a processor configured to estimate the mass of silicates in the fluid directly from the received signal.

In another aspect, the present disclosure provides a computer-readable medium accessible to a processor, the computer-readable medium comprising instructions that enable the processor to perform a method that includes: activating a transmitter to transmit a radio frequency signal into a fluid flowing in a member to excite the silicon nuclei of the fluid, wherein the nuclei are aligned along a direction of a magnetic field; receiving a signal from the silicon nuclei responsive to the transmitted radio frequency signal; and estimating a mass of silicates in the fluid directly from the received signal.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description, taken in conjunction with the accompanying drawings, in which like elements have been given like numerals and wherein.

DETAILED DESCRIPTION OF THE DISCLOSURE

The present disclosure relates to apparatus and methods for controlling flow of formation fluids in a production tubular. The present disclosure provides certain exemplary drawings to describe certain embodiments of the apparatus and methods that are to be considered examples of the principles described herein and are not intended to limit the concepts and disclosure to the illustrated and described embodiments.

Figure 1:
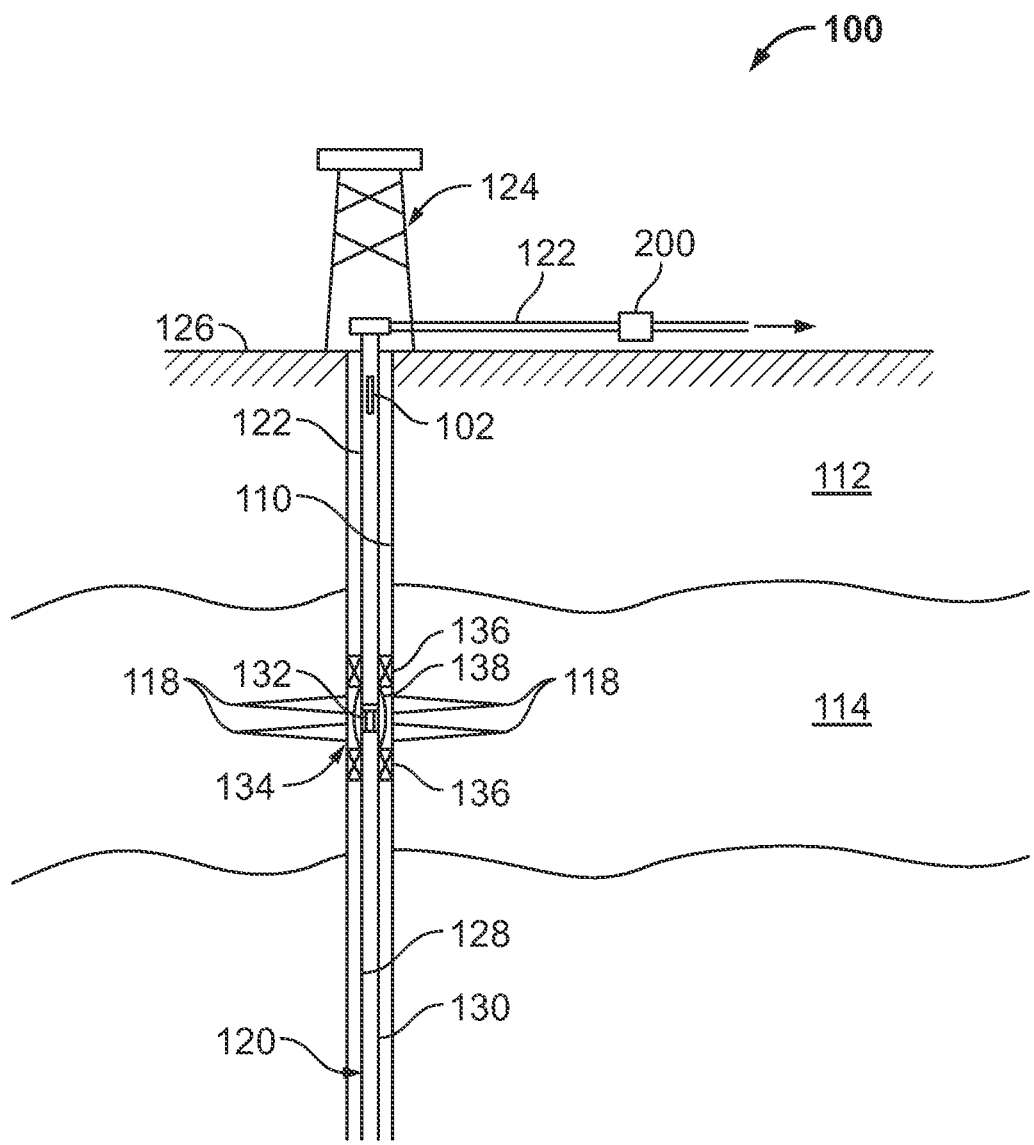
FIG. 1 is a schematic elevation view of an exemplary wellbore having a production string installed therein.

FIG. 1 shows an exemplary production wellbore system 100 that includes a wellbore 110 drilled through an earth formation 112 and into a production zone or reservoir 114. The wellbore 110 is shown lined with a casing having a number of perforations 118 that penetrate and extend into the formations production zones 114 so that production fluids may flow from the production zones 114 into the wellbore 110. The wellbore 110 includes a production string (or production assembly) 120 that includes a tubing (also referred to as the tubular or base pipe) 122 that extends downwardly from a wellhead 124 at the surface 126 of the wellbore 110. The production string 120 defines an internal axial bore 128 along its length. An annulus 130 is defined between the production string 120 and the wellbore casing. The production string 120 is shown to include a vertical section but may also include a generally horizontal portion that extends along a deviated leg or section of the wellbore (not shown). A production device 134 is positioned at a selected location along the production string 120. The production device 134 may be isolated within the wellbore 110 by a pair of packer devices 136. Although only one production device 134 is shown, a large number of such production devices may be arranged along the production string 120.

The production device 134 includes a downhole-adjustable flow control device 138 to govern one or more aspects of flow of one or more fluids from the production zones into the production string 120. The downhole-adjustable flow control device 138 may have a number of alternative structural features that provide selective operation and controlled fluid flow therethrough. The production string may further include an electrical submersible pump 102 for pumping fluid from within the production string 120 to a surface location.

Subsurface formations typically contain sand along with oil and gas. A sand screen is located at the production device 134 to separate sand from formation fluids prior to the formation fluid entering the production string. Typically, a certain amount of sand passes through the sand screen due to effectiveness of the sand screen and wear on the sand screen. Sand detection device 200 may be used to determine an amount of sand presented in production fluid flowing in the tubular 122 using the exemplary methods discussed below.

Figure 2:
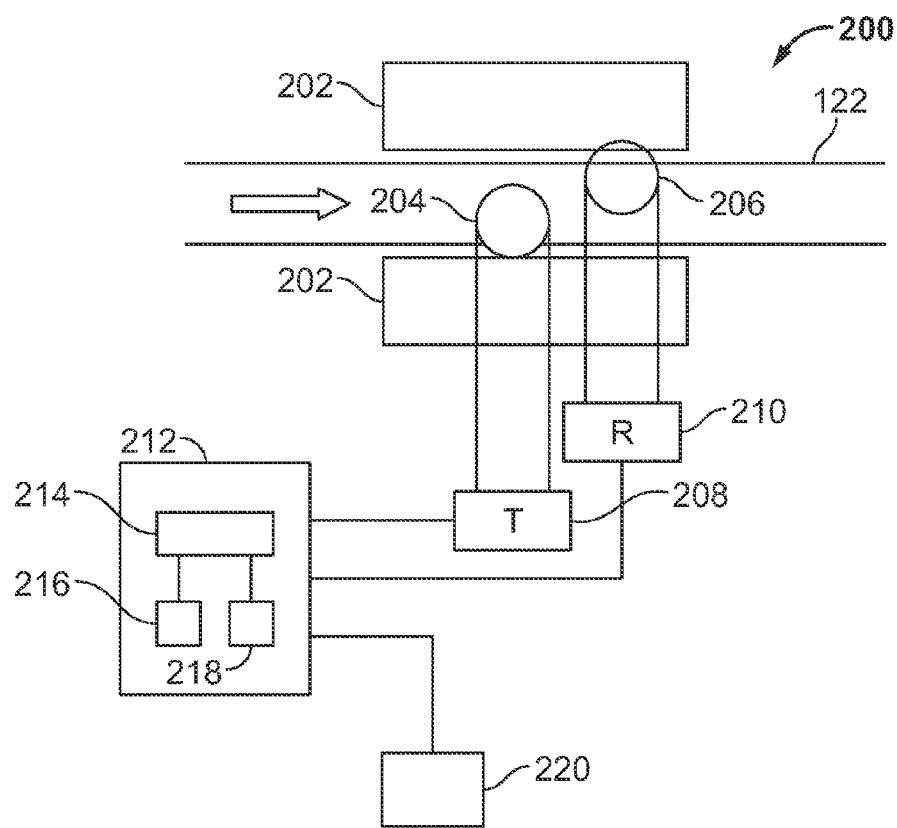
FIG. 2 shows an exemplary sand detection device suitable for use in the exemplary production system of FIG. 1.

FIG. 2 shows a detailed view of the sand detection device 200 used in the exemplary production system 100 of FIG. 1. The sand detection apparatus includes an exemplary Nuclear Magnetic Resonance (NMR) device which, in one embodiment, is configured to determine the presence of silicates, such as kyanite, andalusite, quartz, etc. In various embodiments, the NMR device can also be used to determine various parameters of the fluid flowing in the tubular, such as flow velocity, phase volume, hydrocarbon composition, etc. The sand detection apparatus can be coupled to a section of the tubular at a surface location including at a wellhead location. Alternatively, the sand detection apparatus can be coupled to a section of the tubular at a downhole location.

The NMR device includes a magnetic source 202 generally exterior to a section of the tubular 122. In various embodiments, the magnetic source may be a permanent magnet or an electromagnetic. The magnetic source provides a substantially homogenous magnetic field which defines a sensitive region in the section of the tubular. The NMR device also includes a transmitter 204 and a receiver 206. The transmitter may be an induction coil electrically coupled to transmitter electronics 208. The receiver may be an induction coil electrically coupled to receiver electronics 210. In an alternate embodiment, the transmitter and the receiver may be single coil electrically coupled to electronic circuitry that operates the single coil in both a transmitter mode and a receiver mode. The transmitter coil 204 is configured to provide one or more radio frequency signals, known as NMR excitation pulses, into the fluid flowing in the sensitive region. The transmitter electronics is configured to provide a radio frequency signal to the transmitter coil 204. The transmitter coil 204 is configured to induce a magnetic field of the excitation pulse into the sensitive region. The frequency of the radio frequency signal may be selected to be substantially at a nuclear resonance frequency of an atomic nucleus of the fluid. Production fluids typically include hydrocarbons, consisting primarily of carbon and hydrogen atoms. Therefore, hydrogen NMR ($H^1$ NMR) and carbon NMR ($C^{13}$ NMR) are generally used. For the purposes of the present disclosure, the frequency of the excitation pulse may be the resonant frequency of silicon isotope $Si^{29}$ or at a frequency of about 8.4578 MHz per Tesla of magnetic field applied to obtain $Si^{29}$ NMR measurements indicative of silicon compounds, including silicates and silanes, for example. In one aspect of the present disclosure, the transmitter electronics 208 may be tunable over a range of frequencies, thereby enabling transmitting of excitation pulses at radio frequencies suitable for $H^1$ NMR and $C^{13}$ NMR measurements as well as for $Si^{29}$ NMR measurements.

The receiver electronics 206 is configured to receive one or more signals from the receiver coil 206. The signals from the receiver coil 206 are due to the response of nuclei in the fluid to an excitation pulse fluid provided by the transmitter coil 204. The receiver electronics 206 may be configured to receive signals at a frequency consistent with the responsive frequencies of $Si^{29}$ or may be configured to be tunable over a range of frequencies, thereby enabling receiver coil 206 to receive signals for $H^1$ NMR and $C^{13}$ NMR measurements in addition to the $Si^{29}$ NMR signals.

In an exemplary method, NMR measurements are obtained from fluid flowing through tubular 122. In the exemplary embodiment of FIG. 2, fluid flows from left to right to enter the sensitive region defined by the magnetic field. The fluid may additionally flow through a pre-polarization section pre-polarization magnet (not shown) prior to entering the sensitive region defined by the magnetic field. The nuclei of various atoms and molecules in the fluid are subjected to the magnetic field and align themselves so that the nuclear moments of the nuclei are oriented along the direction of the magnetic field. A radio frequency (RF) signal, known as an excitation pulse, is applied to the aligned nuclei to perturb the nuclei from their aligned position using transmitter 204. The direction of the excitation pulse is typically substantially perpendicular to the direction of the magnetic field. The excitation pulse may include any number of excitation pulse sequences known in the art for NMR testing including a Carr-Purcell-Meiboom-Gill (CPMG) pulse sequence, for example. Upon being perturbed from alignment with the magnetic field, the nuclei tend to realign with the magnetic field at a given relaxation rate. Meanwhile, the nuclei precess about the direction of the magnetic field and thereby produce a radio frequency signal which is received at receiver 206.

The sand detection apparatus also includes a control unit 212 which includes a processor 214, one or more computer programs 216 that are accessible to the processor 214 for executing instructions contained in such programs to perform the methods disclosed herein to determined a mass of silicates in the fluid, and a storage device 134, such as a solid-state memory, tape or hard disc for storing the determining mass and other data obtained at the processor 130. Control unit 212 typically operates transmitter electronics 208 to activate excitation pulses into the sensitive region of the fluid via transmitter 204 and receives signals from receiver electronics 210 induced at receiver 206. Control unit 212 may additionally store data to a memory device 218 or send data to a display 220. Additionally, the control unit may provide an instruction to perform an operation based on the determined mass of silicates. Exemplary operations may include shutting down flow of fluid in the production string, replacing a component of the production string, such as a sand screen, a pump, etc. In addition, the calculated amount of silicates can be used to estimate a life span of various components of the tubular, such as the pump and/or the sand screen. In one embodiment, the processor 214 compares a determined mass amount of silicates to a threshold value and selects the operation based on the comparison.

Typically, atomic nuclei that have a total nuclear magnetic moment equal to zero are unresponsive to NMR methods, while atomic nuclei that have a non-zero nuclear magnetic moment are responsive to the magnetic field and excitation pulse. Sand particles are composed of silicates or Silicon dioxide ($SiO_2$) compounds. The most abundant form of silicon is $Si^{28}$ which has a magnetic moment of zero. However, $Si^{29}$ is a naturally occurring isotope of $Si^{28}$ that has an isotopic abundance of about 4.7% and a non-zero magnetic moment. Therefore, NMR methods can be used to detect the presence of $Si^{29}$. Isotopic abundance calculations can then be used estimate an amount of $Si^{28}$ and/or a total amount of silicon compounds in the fluid. Similar mass calculations can be performed for $H^1$ NMR and $C^{13}$ NMR methods, using an isotopic abundance of about 99.9% for $H^1$ and about 1.1% for $C^{13}$.

For NMR methods, an excitation pulse will be transmitted at a frequency which is known to excite the atomic nucleus of such that the nuclei resonate at a natural resonant frequency known as the Larmour frequency. The frequency ν required to resonate the nuclei may be determined using the equation:

$$v = \frac{\gamma B}{2\pi} \qquad \text{Eq. (1)}$$

where γ is the gyromagnetic ratio of the nucleus and B is the strength of the magnetic field.

The frequency at which the nuclei resonate after having been excited by the RF pulse signal is typically different from the frequency of the excitation pulse. The shift in resonant frequency is a result, in part, of different bond types, such as single bond and double bond as well as the atomic components. Therefore, the change in resonant frequency can be used to determine a species of the compound. Generally, a ratio of the frequency of the received signal to the frequency of the RF excitation pulse is calculated. This ratio is known as chemical shift and is measured in parts per million ("ppm") using the equation below:

$$\delta = \frac{v_{response} - v_{excitation}}{v_{excitation}} \times 10^6 \ ppm \qquad \text{Eq. (2)}$$

where $\delta$ is the chemical shift, $V_{response}$ is the frequency of the received signal and $V_{excitation}$ is the frequency of the excitation pulse.

Figure 3:
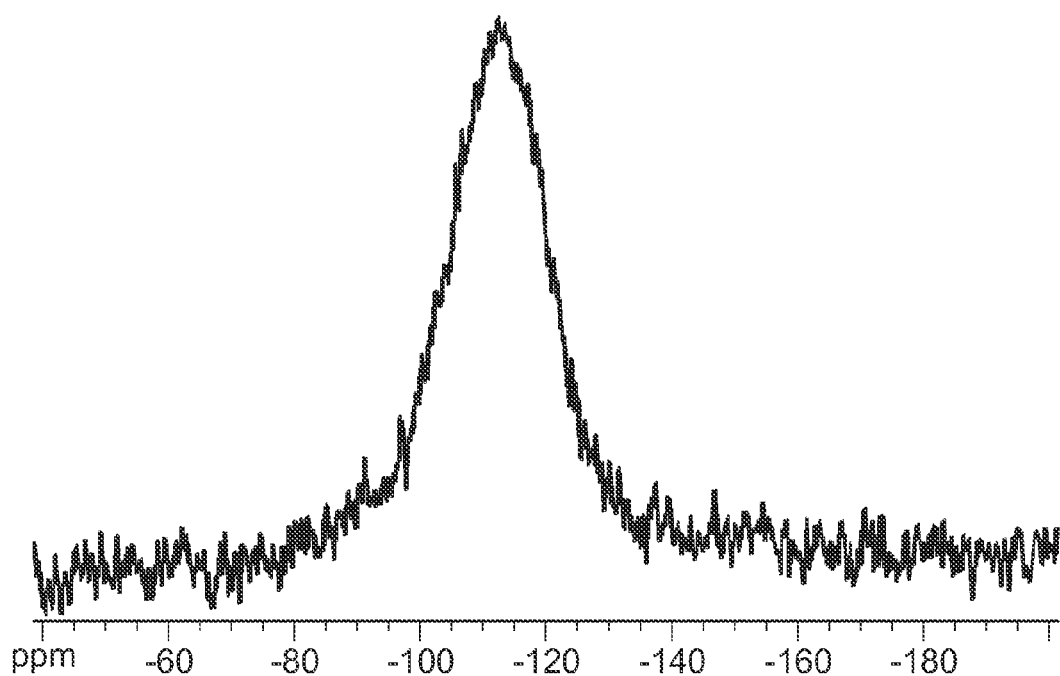
FIG. 3 shows an exemplary chemical shift spectrum of a silicate obtained using exemplary $Si^{29}$ NMR methods of the present disclosure.

FIG. 3 shows an exemplary chemical shift spectrum of a silicate obtained using exemplary $Si^{29}$ NMR methods using an excitation frequency of about 8.4578 MHz per Tesla of magnetic field applied. The exemplary spectrum exhibits a broad peak extending from about 100 ppm to about 130 ppm. The area under the peak is indicative of the number of the $Si^{29}$ atoms present. Therefore, the processor 214 of the control unit 212 may be configured to determine this area to obtain a mass amount of the silicates in the fluid by determining the area under the peak and multiplying by an appropriate correction for $Si^{29}$ isotope abundance.

Figure 4:
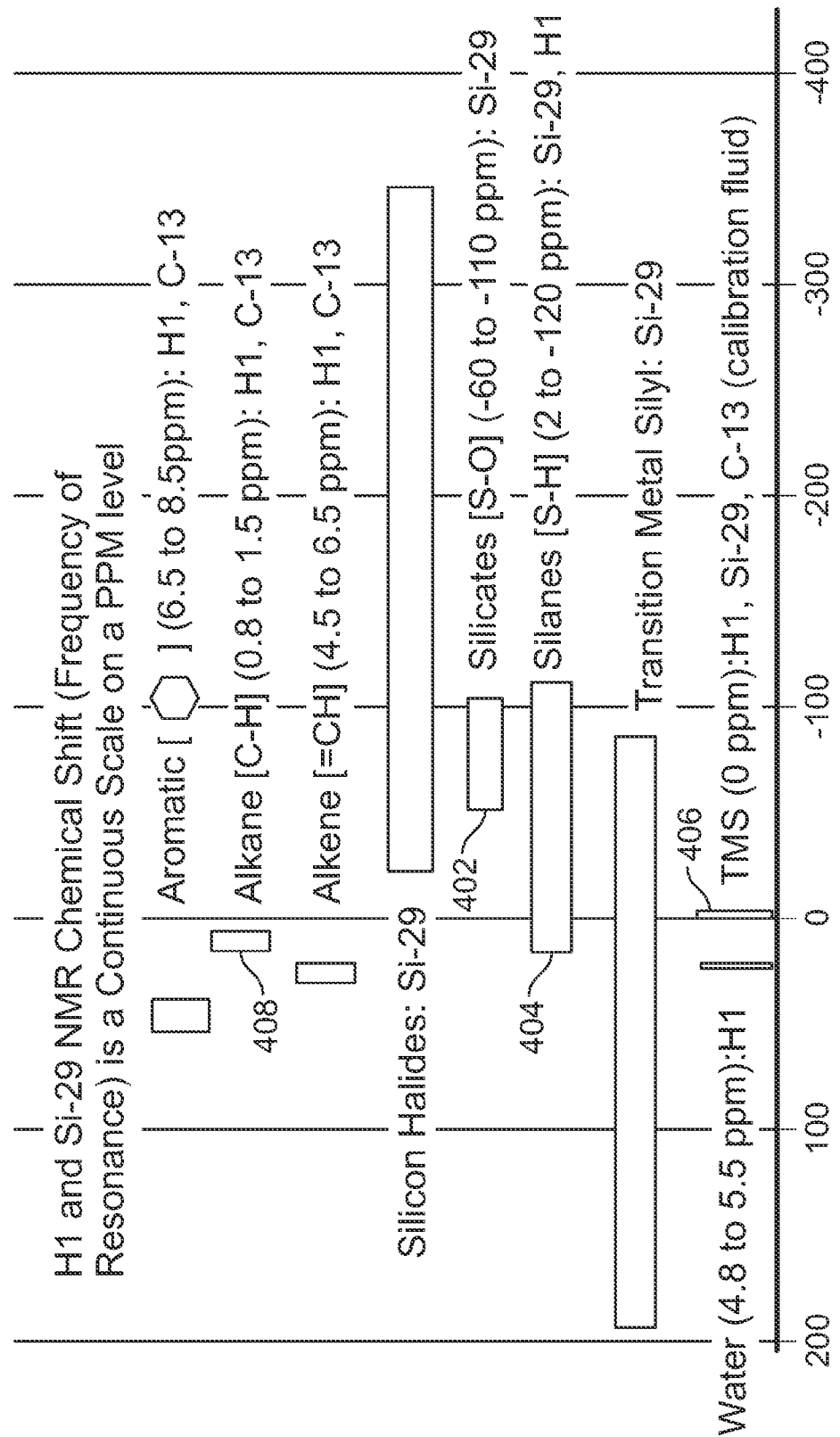
FIG. 4 shows a graph displaying chemical shift ranges for various compounds.

FIG. 4 shows a graph displaying chemical shift ranges for various compounds including various hydrocarbon compounds such as aromatics, alkanes, alkenes as well as for various silicon compounds such as silicon halides, silicates, silanes and transition metal silyl. FIG. 4 also shows a range of chemical shifts for water and TMS (Tetramethyl Silate). TMS 406 can be used as a calibration for $Si^{29}$ NMR measurements. The chemical shift of the hydrocarbon compounds are typically obtained using $H^1$ NMR and $C^{13}$ NMR measurements. The chemical shift of the silicon compounds may be obtained using $Si^{29}$ NMR measurements as described herein. Of the silicon compounds, silicon halides and transition metal silyls are typically man-made compounds and therefore are typically not seen in NMR measurements of production fluids obtained from a downhole formation. However, silicates 402 and silanes 404 are generally carried from downhole reservoirs and their spectrum typically appears in NMR measurements of production fluids.

As stated with reference to FIG. 3, the amount of a compound is related to the area under a spectrum representative of the compound. In one embodiment, a mass of silicates in the fluid can be determined using $Si^{29}$ NMR methods. $Si^{29}$ NMR can be used to obtain a chemical shift spectrum from the fluid. The area of the spectrum from about −60 ppm to about −110 ppm can be calculated to estimate a mass of silicate material having the $Si^{29}$ isotope. The total silicate mass is then determined using the isotopic abundance of ratio of 4.7% for $Si^{29}$.

If silicates are the only silicon compounds in the fluid, then the above method gives the total mass of silicates in the fluid. However, silanes are typically also present in production fluid and as seen in FIG. 4, the spectra for silicates and silanes overlap. Thus, a $Si^{29}$ NMR spectrum obtained from a production fluid will typically have spectral contributions from both silicates and silanes. The $Si^{29}$ NMR spectrum may therefore yield a total mass of silicates and silanes, rather than a mass of silicates alone. In order to determine the mass of the silicates, a mass of silanes may be determined and the determined silane mass is subtracted from the total mass of silicates and silanes.

Methods for determining the mass of silanes in the fluid are now discussed. Silanes include a single bond between silicon an hydrogen (—Si—H). Since silanes include both Si and H atoms, they are responsive to both $Si^{29}$ NMR and $H^1$ NMR. Since silicates include silicon and oxygen, they are generally unresponsive to $H^1$ NMR. Therefore, a chemical shift spectrum obtained using $H^1$ NMR from about +2 ppm to about −120 ppm mostly represents silanes. However, it is apparent from FIG. 4, that the chemical shift spectrum for silanes (from about 2 ppm to about −120 ppm) overlaps with the chemical shift spectrum for alkanes (from about 1.5 ppm to about 0.8 ppm). Since both silanes and alkanes are responsive to $H^1$ NMR, the silane mass may be determined by determining the alkane mass separately and subtracting the alkane mass from a mass value (of silanes and alkanes) obtained from an $H^1$ NMR spectrum. $C^{13}$ NMR may be used to obtain a mass of alkenes. The area under the $C^{13}$ NMR spectrum from about 0.8 ppm to about 1.5 ppm yield a mass of alkanes having $C^{13}$ isotopes. Multiplying this mass by a conversion factor using 1.1% $C^{13}$ isotope abundance yields a total alkane mass in the fluid. It is noted that if the spectrum obtained from total $H^1$ NMR spectrum does not have contributions in the range at which alkane spectrum appears, there is no need to detect alkanes and therefore no need to use $C^{13}$ NMR methods. Therefore, a method of determining silane mass is discussed below with respect to FIG. 5.

Figure 5:
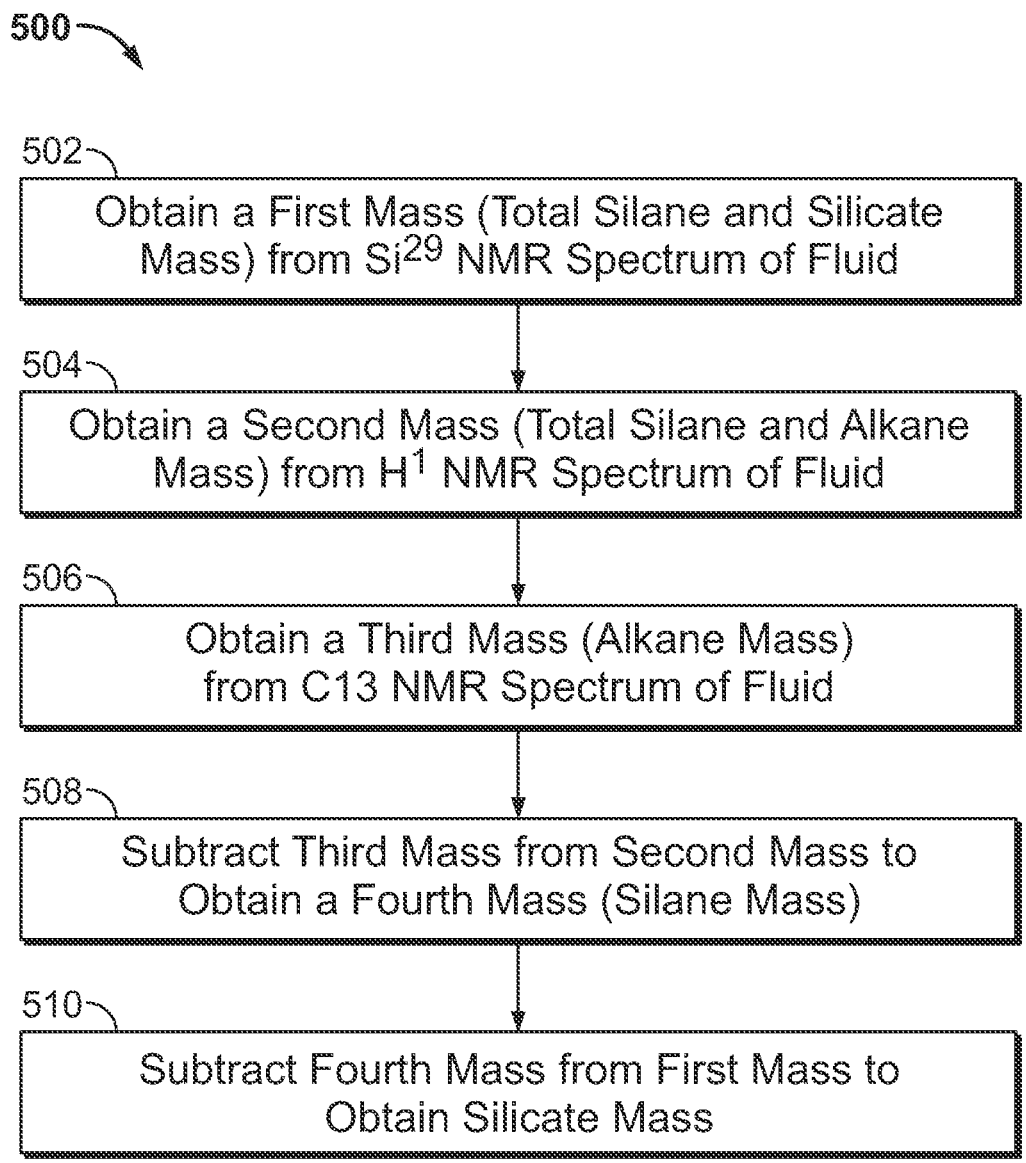
FIG. 5 shows an exemplary flowchart for determining a mass of silicates in a production fluid in an exemplary embodiment of the present disclosure.

FIG. 5 shows an exemplary flowchart 500 for determining a mass of silicates in a fluid flowing in a member, such as a production fluid. In Box 502, a first mass is determined from a $Si^{29}$ NMR spectrum obtained from the fluid. The first mass represents the total mass of silanes and silicates in the fluid. The Si 29 NMR spectrum is obtained and a filter may be applied to the $Si^{29}$ NMR spectrum to remove any contributions outside of the spectral range from about 2 ppm to about −120 ppm. A mass of silicon compounds having $Si^{29}$ is determined by calculating an area under the filtered $Si^{29}$ NMR spectral curve. The first mass may be obtained from the mass of $Si^{29}$ silicon compounds and an isotopic abundance of $Si^{29}$ of 4.7%. In Box 504, a second mass is obtained using $H^1$ NMR. The second mass represents a mass of silanes and alkanes in the fluid. A spectrum is obtained using $H^1$ NMR. A filter is applied to the $H^1$ NMR spectrum to remove contributions outside of the spectral range from about 2 ppm to about −120 ppm. An isotopic mass of $H^1$ is determined by calculating an area under the filtered $H^1$ NMR spectral curve. $H^1$ isotopic abundance is about 99.9% so either the isotopic mass can be multiplied by the appropriate isotopic abundance calculations or the isotopic mass value can be taken as the total mass. In Box 506, a third mass is obtained using a $C^{13}$ NMR. The third mass represents a mass of alkanes in the fluid. A spectrum is obtained using $C^{13}$ NMR. A filter is applied to the $C^{13}$ NMR spectrum to remove contributions outside of the spectral range from about 1.5 ppm to about 0.8 ppm. An isotopic mass for alkanes is determined by calculating an are under the filtered $C^{13}$ NMR spectral curve. The third mass is calculated using the obtained $C^{13}$ mass and a 1.1% isotopic abundance of $C^{13}$. In Box 508, the third mass (alkane mass) is subtracted from the second mass (total alkane and silane mass) to obtain a fourth mass (silane mass). In Box 510, the fourth mass (silane mass) is subtracted from the first mass (total silane and silicate mass) to obtain the total mass of silicates (sand). In equation form, the mass calculations is as follows:

$$M_{Silicates} = M_{Si^{29}} - (M_{H^1} - M_{C^{13}}) \quad \text{Eq. (3)}$$

Therefore, in one aspect, the present disclosure provides a method of estimating a mass of silicates in a fluid flowing in a member, including: inducing a magnetic field in the fluid to align nuclei of the fluid along a direction of the magnetic field; transmitting a radio frequency signal into the fluid from a transmitter to excite silicon nuclei present in the fluid; receiving a signal from the silicon nuclei responsive to the transmitted radio frequency signal at a receiver; and using a processor to estimate the mass of silicates in the fluid directly from the received signal. The method may further include performing an operation based on the estimated mass of silicates that is one of: (i) shutting down the flow of fluid through the member; and (ii) estimating a life span of a component of the member. In an embodiment in which the fluid flows in the member via a sand screen, the method may include replacing the sand screen at the member based on the estimated mass of silicates. In an embodiment in which the member includes a pump for pumping the fluid in the member, further comprising replacing the pump based on the estimated mass of silicates. The method may include determining an isotopic mass of a compound from an NMR spectrum obtained from the fluid, and multiplying the determined isotopic mass by an appropriate isotopic abundance ratio to determine the total mass of the compound in the fluid. In one embodiment, the silicate mass is determine by: (i) determining a first mass from a $Si^{29}$ NMR spectrum obtained from the fluid; (ii) determining a second mass from an $H^1$ NMR spectrum obtained from the fluid; (iii) determining a third mass from a $C^{13}$ NMR spectrum obtained from the fluid; (iv) subtracting the third mass from the second mass to obtain a fourth mass; and (v) subtracting the fourth mass from the first mass to obtain the mass of silicates in the fluid. The transmitted radio frequency signal may be transmitted from a tunable transmitter. The responsive signal may be received at a tunable receiver. The magnetic field may be induced in the fluid at one of: (i) a surface location; (ii) a downhole location; and (iii) a wellhead.

In another aspect, the present disclosure provides an apparatus for estimating a mass of silicates in a fluid flowing in a member, including: a magnetic source configured to induce a magnetic field in the fluid to align nuclei of the fluid along a direction of the magnetic field; a transmitter configured to transmit a radio frequency signal into the fluid to excite silicon nuclei present in the fluid; a receiver configured to receive a signal from the silicon nuclei responsive to the transmitted radio frequency signal; and a processor configured to estimate the mass of silicates in the fluid directly from the received signal. The processor may be further configured to perform an operation based on the estimated mass of silicates that is one of: (i) shutting down the flow of fluid in the member; and (ii) estimating a life span of a component of the tubular. For fluid flowing in the member via a sand screen, the processor may be further configured to provide an instruction to replace a sand screen at the member based on the estimated mass of silicates. For the member including a pump for pumping the fluid in the member, the processor may be further configured to provide an instruction to replace the pump based on the estimated mass of silicates. The processor may be configured to determine an mass of an isotopic compound from an NMR spectrum obtained from the fluid, and multiply the estimated isotopic mass by an appropriate isotopic abundance ratio to obtain a total mass of the compound. In one embodiment, the processor is configured to: (i) determine a first mass from a $Si^{29}$ NMR spectrum obtained from the fluid; (ii) determine a second mass from a $H^1$ NMR spectrum obtained from the fluid; (iii) determine a third mass from $C^{13}$ NMR spectrum obtained from the fluid; (iv) subtract the third mass from the second mass to obtain a fourth mass; and (v) subtract the further mass from the first mass to obtain the mass of silanes present in the fluid. In various embodiments, at least one of the transmitter and the receiver is tunable. The magnetic source is generally configured to induce the magnetic field at one of: (i) a surface location; (ii) a downhole location; and (iii) a wellhead.

In another aspect, the present disclosure provides a computer-readable medium accessible to a processor, the computer-readable medium comprising instructions that enable the processor to perform a method that includes: activating a transmitter to transmit a radio frequency signal into a fluid flowing in a member to excite the silicon nuclei of the fluid, wherein the nuclei are aligned along a direction of a magnetic field; receiving a signal from the silicon nuclei responsive to the transmitted radio frequency signal; and estimating a mass of silicates in the fluid directly from the received signal. The computer-readable medium may further includes instructions to: obtain a first mass from a $Si^{29}$ NMR spectrum received at the processor from the fluid; obtain a second mass from a $H^1$ NMR spectrum received at the processor from the fluid; obtain a third mass from a $C^{13}$ NMR spectrum received at the processor from the fluid; subtract the third mass from the second mass to obtain a fourth mass; and subtract the further mass from the first mass to estimate the mass of silicates in the fluid. Further instructions may include instructions to shut down flow of the fluid and/or estimate a life time of a component of the member based on the estimated mass of silicates in the fluid. In one embodiment the medium includes instructions to determine a mass of an isotopic compound in the fluid from an NMR spectrum obtained from the fluid and multiply the determined isotopic mass by an appropriate isotopic abundance ratio to obtain a total mass of the compound in the fluid.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of estimating a mass of silicates in a fluid flowing in a member, comprising:
   inducing a magnetic field in the fluid to align nuclei of the fluid along a direction of the magnetic field;
   transmitting radio frequency signals into the fluid from a transmitter to excite nuclei present in the fluid;
   receiving signals from the nuclei responsive to the transmitted radio frequency signals at a receiver to obtain a $Si^{29}$ NMR spectrum, an $H^1$ NMR spectrum and a $C^{13}$ NMR spectrum; and
   determining a first mass from the $Si^{29}$ NMR spectrum obtained from the fluid;
   determining a second mass from the $H^1$ NMR spectrum obtained from the fluid;
   determining a third mass from the $C^{13}$ NMR spectrum obtained from the fluid;
   subtracting the third mass from the second mass to obtain a fourth mass; and
   subtracting the fourth mass from the first mass to estimate the mass of silicates in the fluid.

2. The method of claim 1 further comprising performing an operation based on the estimated mass of silicates, wherein the operation is at least one of: (i) shutting down the flow of fluid through the member; (ii) estimating a life span of a component of the member.

3. The method of claim 1, wherein the fluid flows in the member via a sand screen, further comprising replacing the sand screen at the member based on the estimated mass of silicates.

4. The method of claim 1, wherein the member comprises a pump for pumping the fluid in the member further comprising replacing the pump based on the estimated mass of silicates.

5. The method of claim 1 further comprising determining a mass of an isotopic compound in the fluid from an NMR spectrum obtained from the fluid, and multiplying the determined isotopic mass by an appropriate isotopic abundance ratio.

6. The method of claim 1 further comprising at least one of: (i) transmitting the radio frequency signals from a tunable transmitter; and (ii) receiving the responsive signals at a tunable receiver.

7. The method of claim 1 further comprising inducing the magnetic field in the fluid at one of: (i) a surface location; (ii) a downhole location; and (iii) a wellhead.

8. An apparatus for estimating a mass of silicates in a fluid flowing in a member, comprising:
 a magnetic source configured to induce a magnetic field in the fluid to align nuclei of the fluid along a direction of the magnetic field;
 a transmitter configured to transmit radio frequency signals into the fluid to excite nuclei present in the fluid;
 a receiver configured to receive signals from the excited nuclei responsive to the transmitted radio frequency signals; and
 a processor configured to;
 obtain a $Si^{29}$ NMR spectrum, an $H^1$ NMR spectrum and a $C^{13}$ NMR spectrum from the received signals;
 determine a first mass from the $Si^{29}$ NMR spectrum obtained from the fluid;
 determine a second mass from the $H^1$ NMR spectrum obtained from the fluid;
 determine a third mass from the $C^{13}$ NMR spectrum obtained from the fluid;
 subtract the third mass from the second mass to obtain a fourth mass; and
 subtract the further mass from the first mass to estimate the mass of silicates present in the fluid.

9. The apparatus of claim 8, wherein the processor is further configured to perform an operation based on the estimated mass of silicates, wherein the operation is selected from the group consisting of: (i) shutting down the flow of fluid in the member; and (ii) estimating a life span of a component of the member.

10. The apparatus of claim 8, wherein the fluid flows in the member via a sand screen, the processor further configured to provide an instruction to replace a sand screen at the member based on the estimated mass of silicates.

11. The apparatus of claim 8, wherein the member comprises a pump for pumping the fluid in the member, the processor further configured to provide an instruction to replace the pump based on the estimated mass of silicates.

12. The apparatus of claim 8, wherein the processor is further configured to determine a mass of an isotopic compound from an NMR spectrum obtained from the fluid, and multiply the determined isotopic mass by an appropriate isotopic abundance ratio.

13. The apparatus of claim 8, wherein at least one of: (i) the transmitter is a tunable transmitter; and (ii) the receiver is a tunable receiver.

14. The apparatus of claim 8, wherein the magnetic source is further configured to induce the magnetic field at one of: (i) a surface location; (ii) a downhole location;
 and (iii) a wellhead.

15. A non-transitory computer-readable medium accessible to a processor, the computer-readable medium comprising instructions that enable the processor to perform a method that comprises:
 activating a transmitter to transmit radio frequency signals into a fluid flowing in a member to excite the nuclei of the fluid, wherein the nuclei are aligned along a direction of a magnetic field; and
 receiving signals from the nuclei responsive to the transmitted radio frequency signal;
 obtaining a $Si^{29}$ NMR spectrum, an $H^1$ NMR spectrum and a $C^{13}$ NMR spectrum from the received signals;
 determining a first mass from the $Si^{29}$ NMR spectrum obtained from the fluid;
 determining a second mass from the $H^1$ NMR spectrum obtained from the fluid;
 determining a third mass from the $C^{13}$ NMR spectrum obtained from the fluid;
 subtracting the third mass from the second mass to obtain a fourth mass; and
 subtracting the fourth mass from the first mass to estimate the mass of silicates in the fluid.

16. The non-transitory computer-readable medium of claim 15, wherein further comprising instructions to shut down flow of the fluid and estimate a life time of a component of the member based on the estimated mass of silicates in the fluid.

17. The non-transitory computer-readable medium of claim 15 further comprising instructions to determine a mass of an isotopic compound in the fluid from an NMR spectrum obtained from the fluid and multiply the determined isotopic mass by an appropriate isotopic abundance ratio.

* * * * *